R. E. FUDGE.
WRAPPING MACHINE.
APPLICATION FILED FEB. 2, 1912.

1,103,500.

Patented July 14, 1914.
5 SHEETS—SHEET 2.

R. E. FUDGE.
WRAPPING MACHINE.
APPLICATION FILED FEB. 2, 1912.

1,103,500.

Patented July 14, 1914.

R. E. FUDGE.
WRAPPING MACHINE.
APPLICATION FILED FEB. 2, 1912.

1,103,500.

Patented July 14, 1914.
5 SHEETS—SHEET 5.

Witnesses:-
F. George Barry.
Henry C. Thieme.

Inventor:-
Raymond E. Fudge
by his attorneys
Brown & Seward

UNITED STATES PATENT OFFICE.

RAYMOND EVERETT FUDGE, OF WEST HAVEN, CONNECTICUT, ASSIGNOR TO THE ROWLAND MACHINE COMPANY, OF NEW HAVEN, CONNECTICUT, A CORPORATION OF CONNECTICUT.

WRAPPING-MACHINE.

1,103,500.   Specification of Letters Patent.   Patented July 14, 1914.

Application filed February 2, 1912. Serial No. 674,904.

*To all whom it may concern:*

Be it known that I, RAYMOND EVERETT FUDGE, a citizen of the United States, and resident of West Haven, in the county of New Haven and State of Connecticut, have invented a new and useful Improvement in Wrapping-Machines, of which the following is a specification.

My invention relates to a wrapping machine and more particularly to a wrapping machine for wrapping commodities where the commodity to be wrapped has sufficient inherent stiffness to maintain its shape while being wrapped without mechanical support on its several sides to hold it in shape.

The object is to provide a machine which will rapidly and effectively fold a wrapper of suitable flexible material, for instance, paper, around a commodity, and by the application of heat, seal the wrapper in its folded position.

The particular form of machine to which my present invention relates is suitable for wrapping loaves of bread, but it is obvious that by changing the proportions of the parts, it may be used for wrapping other commodities than loaves of bread without changing the invention.

In the accompanying drawings, Fig. 5 is a vertical section in the plane of the line C—C of Fig. 2, and Figs. 6, 7, 8, 9 and 10 represent respectively in perspective the position of the wrapper on the loaf at the several steps from the time it is fed to the machine to the time it is discharged therefrom.

Broadly stated, the machine comprises a wheel provided with a plurality of pockets in its periphery; means for imparting to the wheel a step by step movement, each step corresponding to the distance between two pockets; means for feeding loaves of bread into the pockets as they successively present themselves opposite the feeding mechanism; means for discharging the wrapped loaves as the pockets successively present themselves to a discharging mechanism; means for progressively forming the folds in the wrapper at step by step intervals; means for applying heat to the wrapper while its folds are retained in their folded position to seal the wrapper and means for automatically stopping the machine when no loaf of bread is in position to be fed.

My invention further contemplates certain features of construction and combinations of parts constructed and arranged to assist in making the foregoing indicated means practically successful as will be hereinafter specifically described and pointed out in the claims.

Figure 3:
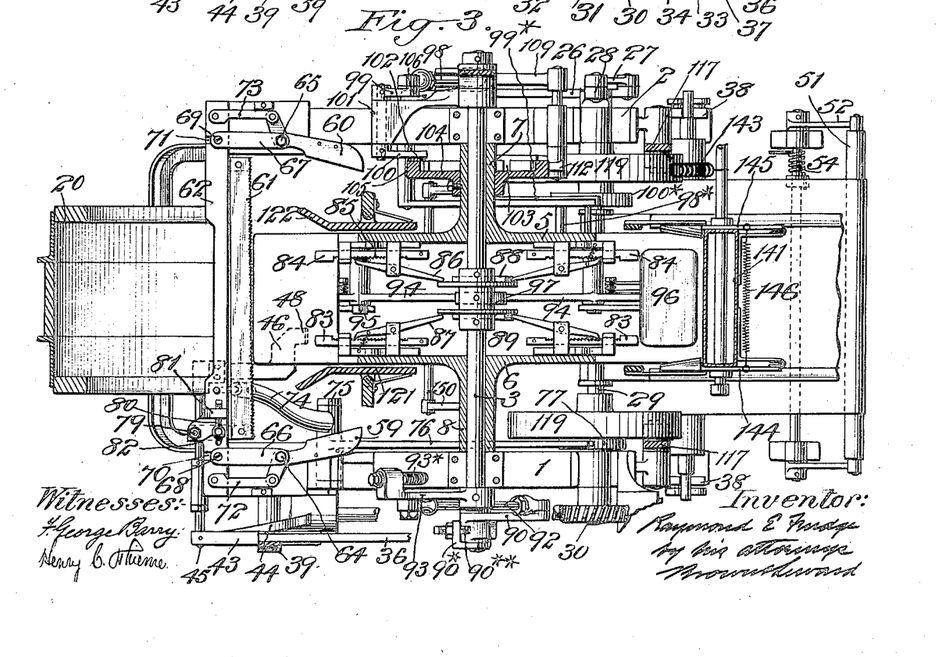
Fig. 3 is a horizontal section in the plane of the line A—A of Fig. 1.

The supporting frame may conveniently consist of two A-shaped frames 1 and 2, spaced apart by suitable girders and having at their apexes suitable bearings for a shaft 3 on which the loaf-receiving wheel 4 is mounted. The wheel 4 consists specifically of two disks, see Fig. 3, denoted respectively by 5 and 6, each being provided with an extended hub, the hub of the disk 5 being denoted by 7 and the hub of the disk 6 being denoted by 8. These disks are suitably connected to move together as one, by inwardly directed plates 9, one at each of the loaf-receiving pockets, see Fig. 4, and they are also connected by tie bolts 10. The wheel 4 rotates on the shaft 3, independently of the shaft, the latter passing with a rotary fit through the hubs 7 and 8.

The number of pockets which I have chosen to provide in the present machine is eight, although it is obvious that this number might be changed at pleasure. These pockets are denoted by 11, 12, 13, 14, 15, 16, 17, 18, in consecutive order in a direction in which the hands of a clock move.

Figure 6:
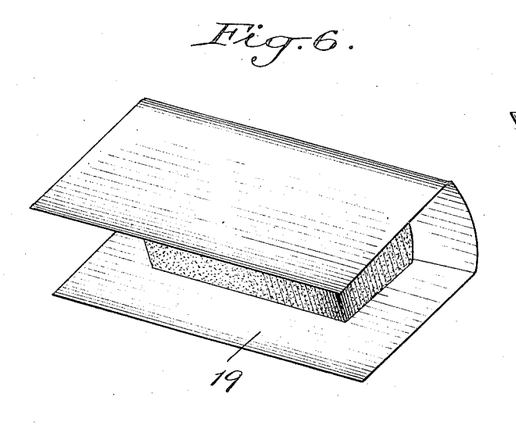
Figure 8:
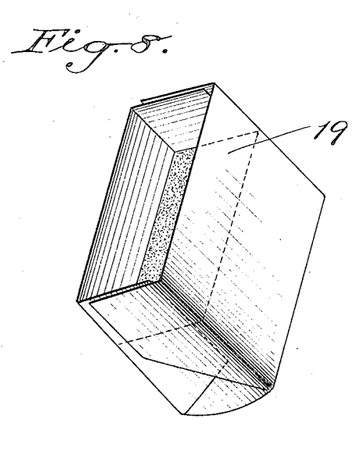
Figure 9:
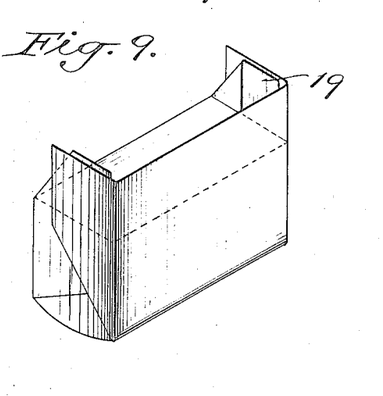
Figure 10:
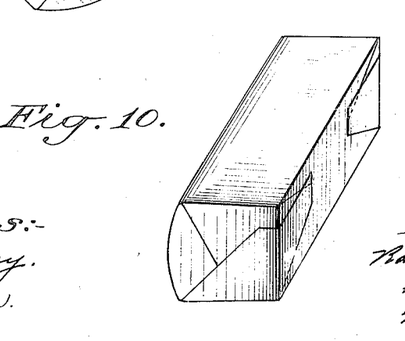

As the loaf of bread is forced into the pocket 11, the paper wrapper, denoted by 19, and which may be in practice paraffin paper, takes the folds indicated in Fig. 6, covering the top and two opposite sides of the loaf. When the pocket 11 with the loaf therein reaches the position which the pocket 12 previously assumed, see Fig. 4, the opposite ends of the wrapper will be folded in, making the wrapper assume the folds indicated in Fig. 7. When the pocket 11 reaches the position which the pocket 13 previously assumed, the side flaps at the opposite ends will be folded down into the position shown in Fig. 8. When the pocket 11 reaches the position previously occupied by the pocket 14, one of the projecting side flaps will be folded down on to the bottom of the loaf, as shown in Fig. 9, and as the loaf moves from the position of pocket 14 to the position of pocket 15, the opposite ends and sides which are left unfolded, as indicated in Fig. 9, will be gradually folded inwardly and downwardly, the side flap being tucked under the opposite end flaps into the position shown in Fig. 10, and in this position they will be held while the wrapped loaf passes into sealing contact with the heater to seal the wrapper in position, and when the pocket 11 reaches the position indicated by pocket 17, the loaf will be discharged. The several mechanisms for feeding the loaf and for making these folds and holding the loaf in position while they are being made and setting it free when it is to be discharged are specifically constructed as follows:

The bread chute is denoted by 20. It stands on an incline at what may for convenience be termed the front of the machine, and down this chute the loaves of bread may be fed, superposed loaf upon loaf, with their tops for example toward the machine and their bottoms resting on the floor of the chute. The loaf at the bottom of the chute is forced from under the loaf above it, into the pocket opposite the lower end of the chute, in the present instance the pocket 11, by means of a pusher 21. The pusher 21 is pivoted at 22, to a slide 23 which travels along ways 24, one of these ways being shown in Fig. 4, and it being understood that there is a second way spaced from, opposite to and corresponding to the way 24, for receiving the opposite end of the slide 23. This slide 23 and the pusher 21 are operated at proper intervals by means of a rock shaft 25 suitably mounted in the frames 1 and 2, the shaft 25 being rocked by means of an arm 26 connected by a link 27 with a crank arm 28 on a cam shaft 29, the latter being provided with a worm wheel 30 fixed thereon driven by a worm 31 on a drive shaft 32 provided with a fast and loose pulley 33, 34, receiving power from a suitable source, not shown, through a belt 35. A belt-shifter 36 is supported at one end on the rod 37 uprising from a bracket 38 on the main frame and its opposite end is connected with a manually operated lever 39, the lever being fulcrumed at 40 on the bracket 41 attached to the main frame. The belt-shifter 36 is provided with a shoulder 42 on its under side which is normally engaged by a dog 43, the dog being held in position by a spring 44. The dog 43 is made fast to a rock shaft 45, which shaft has also connected therewith an arm 46, the shape of which is shown in plan in dotted lines in Fig. 3.

The pusher 21 has projecting below its pivot 22, a nose 47 in the path of the rounded toe 48 on the arm 46, and the said pusher, when in its upright position for pushing the loaf, bears above the pivot 22 against the slide 23 to prevent it from tilting back but the said pusher is free to tilt forward by the engagement of its nose 47 with the toe 48 when there is no obstruction to hold it in an upright position. The arrangement of the pusher and the toe 48 on the arm 46, is such that the pusher 21 will engage the loaf just after the nose 47 rides over the toe 48, the pusher being allowed to tilt forward to permit the nose 47 to ride over 48, and when the pusher engages the loaf, it will push the loaf forward to the extent of movement of the slide 23. On its return movement if a succeeding loaf has been fed down into the path of the pusher, it will tilt the pusher forward, raising its nose 47 above the toe 48, and the slide will return into the position shown in Fig. 4. If, however, there is no succeeding loaf fed into position to engage the pusher 41, the latter on its return movement with the slide 23 will assume an upright position and the nose 47 will engage the toe 48, forcing the latter backwardly and hence rocking the shaft 45 sufficiently to disengage the dog 43 from the belt shifter 36, thereby permitting the belt shifter to move to the left as the drawing is held, under the tension of the spring 49, to throw the belt onto the loose pulley 34, thereby stopping the machine. As soon as the nose 47 has operated the toe 48 to rock the shaft 45, it will ride over the toe 48 and assume its normal position shown in Fig. 4, ready for further action.

The wrapping paper 19 is fed from a roll 50 supported in suitable bearings on the bracket 38, and its corresponding bracket on the frame 2, and leads thence to a tension roll 51 supported in uprights 52 supported on a rod 53 and having tension applied thereto by means of a spring 54. Thence the said paper passes around a guide roll 55 supported in a bracket 56 and its companion bracket on the other side frame, thence between a pair of guides 57, 58, located near the lower edge of a pocket occupying the position of the pocket 11, thence across the mouth of the pocket and along the face of the wheel 4, to a succeeding pocket 12. In practice the paper is fed by the movement of the wheel 4 carrying a loaf of bread in the pocket 11 from its receiving position into the position shown of pocket 12, and not until after this movement of the wheel 4 has taken place, will the paper be severed half way between the position of the pocket 11 and the pocket 12. Of course in starting the machine, the end of the paper may be drawn over the face of the wheel 4 a sufficient distance to give the necessary margin for wrapping the first loaf, and after that the feed will automatically take care of itself. The paper is further fed by the pressure of the loaf as it is pushed in by the pusher 21, the loaf in the position of pocket 12 holding that end of the paper against giving way until after the loaf is seated in the position of pocket 11.

After the loaf is seated in the pocket 11, the paper is cut intermediate of the position of the pockets 11 and 12 by the blades 59, 60, working in close proximity to and coacting with the saw edge on the blade 61 between which and the periphery of the wheel 4 the paper passes. The blade 61 is secured to a bar 62 movable toward and away from the periphery of the wheel 4, a distance sufficient to force the edge of the blade 61 into recesses 63 in the periphery of the wheel. The blades 59 and 60 are pivoted at 64 and 65 to the ends of links 66, 67, the opposite ends of the said links being attached to fixed pivots 68, 69, the bar 62 being slotted as at 70, 71, to permit it to slide on the pivots 68, 69 as guides. Links 72, 73, are pivoted at one end to the bar 62, and at their opposite ends to the tails of the blades 59, 60, so that when the bar 62 is advanced toward the periphery of the wheel 4, it will rock the blades 59, 60, on their pivots 64, 65, closing them in in proximity to the saw edge on the blade 61 to cut the paper.

The blades 59, 60 are in effect chopping blades and have double edges which straddle the edge of the blade 61. The latter is set oblique to the plane of the paper and shears the paper intermediate of the points where the chopping blades sever it.

Figure 1:
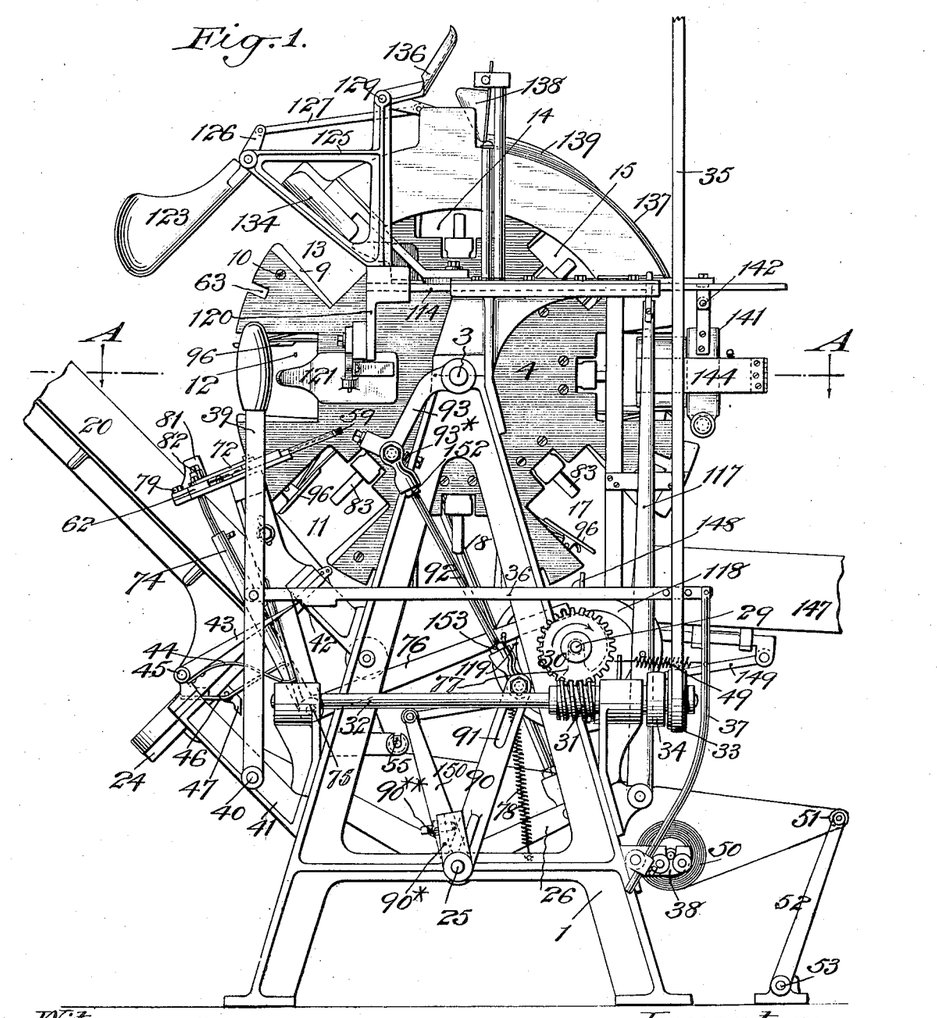
Figure 1 is a view of the machine in side elevation.

The bar 62 is positively moved toward the periphery of the wheel 4, by means of an arm 74 attached to a shaft 75 to rock with an arm 76 operated by a cam 77 on the cam shaft 29, the shape of the cam being shown in dotted lines in Fig. 1, as having an abrupt face off which the end of the arm 76 suddenly drops to effect the cutting and is then promptly raised and held raised to hold the cutters out of operation. The arm 76 is drawn toward the face of the cam 77 in a derection to promptly operate the blades by means of a spring 78. The blade 61 may be tightened by making the supporting lug at one end pivoted as at 79 and providing an adjusting screw 80 seated in a lug 81 and bearing against a projection 82 on the blade supporting lug.

In order to hold the bottom of the loaf in its proper relation to the periphery of the wheel 4, whether the loaf be a little larger or a little smaller than the normal, and to provide for loaves of intentionally different heights and still maintain the bottom of the loaf in its proper relation to the periphery of the wheel, adjustable stops 83, 84, are provided supported to slide inwardly under the pressure of the loaf as it is forced into the pocket. These stops are provided with ratchet teeth 85 on their faces, which ratchet teeth are engaged simultaneously on each stop by spring actuated pawls 86, 87, controlled by cams 88, 89, fixed to the shaft 3, and so arranged that they will permit the pawls to engage the ratchets on the stops at the moment when the loaf has been pushed to a point where its bottom is in the desired relation to the periphery of the wheel 4. The moment when the pawls 86, 87, shall engage the ratchet teeth is determined by the advance of the pusher, the shaft 25 which transmits motion to the pusher having thereon an arm 90 loose on the shaft 25 and positively driven by the short arm 90* carrying the adjusting screw 90**. The said arm 90 is provided with an elongated slot 91 in which one end of a rod 92 is engaged, the said rod 92 leading to a crank arm 93 connected with and serving to rock the shaft 3. The said crank arm 93 is held in its position to the left by a spring 93* against the tension of which the crank arm 93 is rocked when the said arm is operated by the short arm 90*. The pawls will be allowed to remain in engagement with the stops 83, 84, until the loaf is discharged, when the rocking of the shaft 3 by the means hereinbefore described, will bring the cams 88, 89, into operative engagement with the tails of the pawls and allow the stops to slide toward the periphery of the wheel 4, under the influence of gravity, as clearly shown in Fig. 4, just before the pocket in which they are located reaches the position of the pocket 11 to receive the loaf. This same rocking of the shaft 3 also serves to clamp the loaf in the pocket into which it has been fed, as follows: A spring actuated lever 94, one for each loaf receiving pocket on the wheel 4 is pivotally secured as at 95, and carries at its end opposite the side of the loaf, a pressure plate 96, which under the spring tension of the lever 94, will be forced into contact with the side of the loaf when the lever 94 is permitted to act under the force of its spring. The lever 94 is so permitted to act by a snail-like cam 97 fixed on the shaft 3 in position to engage the tail of the lever 94 and hold its clamping plate 96 out of contact with the loaf until such time as the loaf has been forced into the pocket when the cam, together with the shaft 3 by the rocking movement hereinabove referred to, will release the lever 94 and permit it to clamp the loaf by pressure upon its side and will hold the loaf so clamped until the step has been reached where it is to be discharged, when the cam 97 by the rocking of the shaft 3 will engage the tail of the lever 94 and release the loaf, and the said lever will be held released until a succeeding loaf has been forced into its pocket at the beginning of a wrapping operation.

Figure 2:
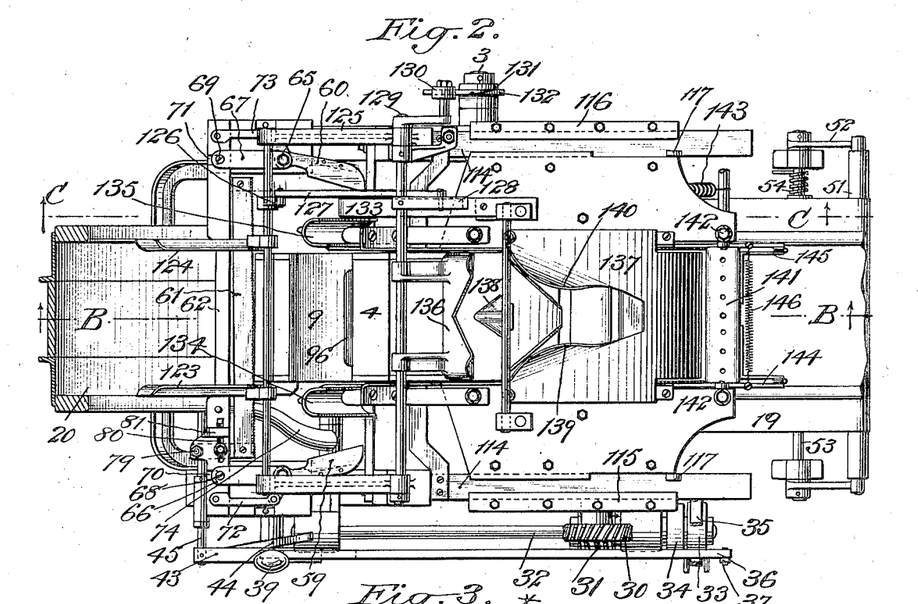
Fig. 2 is a top plan view.
Figure 7:
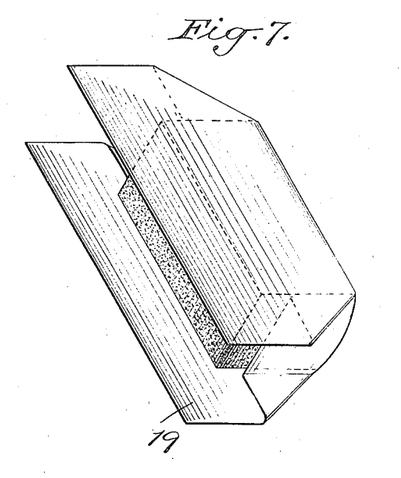

A loaf of bread having been received in the pocket, folding the paper around three sides thereof and allowing it to extend beyond the ends thereof, and the loaf having been clamped in the pocket, the wheel 4 is moved a step in advance by means of a rod 98 connected at one end with the arm 26 hereinbefore referred to and at its opposite end with an arm 99 of a rocking pawl 100 mounted in a suitable bearing in the end of an arm 101 loosely mounted on the shaft 3. The pawl 100 is provided with a pin 102 at its free end adapted to enter one of the several notches or recesses 103 in the periphery of a wheel 104 fixed to one of the hubs, in the present instance the hub 7 of the wheel 4. The pawl 100 is further provided with a pin 105 which prevents the engaging pin 102 from passing through the notch or recess 103 in the wheel 104 by engaging the periphery of the wheel intermediate of two notches. As the rod 98 is drawn downwardly, the pawl 100 will be rocked in a direction to throw the pin 102 out of the notch or recess in the periphery of the wheel 104, the said notch being provided with a beveled edge for permitting the pin to come out, and this rocking movement will continue until the arm 99 to which the rod 98 is connected, engages a stop 106 carried by the arm 101. The arm 101, together with the pawl mounted therein, will then be swung downwardly on the shaft 3 until the pin 102 reaches and engages a curved spring 107 by means of which it will be crowded into a succeeding notch in the wheel 104, and the upward movement of the rod 98 will rotate the wheel 104 and hence the pocket wheel 4, one step. The downward movement of the rod 98 will, by means of a nut or stop 108 thereon, draw downwardly on a bar 109 held supported by means of a spring 110 and serving to support a brake 111 hinged to an arm 112 on a rocking spindle 113, and thereby draw the brake 111 away from engagement with the periphery of the wheel 104, permitting the latter to turn freely. The upward movement of the rod 98 will permit the brake 111 to act so that there will be no tendency for the wheel 104 and the pocket wheel 4 connected to rotate therewith, to move under its own momentum beyond the predetermined point for the reception of a new loaf. The wheel 4 is held in the exact position to receive a loaf, by means of the recesses 63 also serving as retaining slots which receive a pin 98* on a rocking arm 99* operated by a cam 100* on the shaft 29. After the loaf of bread in the pocket 11 has reached the position previously occupied by the pocket 12, the ends of the wrapper are folded in from the top of the loaf against the ends of the loaf, as shown in Fig. 7. This is accomplished by means of the advance movement of the carriage 114 sliding in ways 115, 116, see Fig. 2, and operated by rocking arms 117, the said arms being rocked by rollers 117* thereon which enter the grooves 118 in rotary cams 119. The carriage 114 has downwardly projecting arms 120, these arms carrying at their lower ends folding plates 121, 122. While the carriage 114 is advanced to form the first fold at the ends as shown in Fig. 7, a succeeding loaf is being received in the pocket occupying the position corresponding to the pocket 11, Fig. 4, as hereinbefore described. After the carriage 114 has receded into the position shown in Fig. 1, the pocket wheel 4 is advanced another step in the manner already described, bringing the loaf which last occupied the position of pocket 12, into the position occupied by pocket 13. The carriage 114 is again advanced by the means hereinabove described, and this movement of the carriage folds one flap at each end under, as shown in Fig. 8, while the other flap at each end is folded into the position shown in Fig. 8, as the wheel advances on its succeeding step. This is accomplished as follows: A pair of folders 123, 124, are hinged in a frame 125 attached to the forward end of the carriage 114 and are rocked inwardly by means of a tail piece 126 fixed to rock with the folders 123, 124, and connected by a rod 127, see Fig. 5, with a drop arm 128 hinged to the frame 125 at 129. The drop arm 128 has fixed to rock therewith an arm carrying a roller bearing 130 which rests on the upper end of a plate-like arm 131 fixed on the shaft 3, so as to rock with the shaft. One corner of the plate-like arm 131 is beveled as at 132, to engage the roller 130 to ride up into position on the end of the plate-like arm 131, as shown in full lines in Fig. 5, when the parts return from the position shown in dotted lines in Fig. 5. A spring 133 is fixed in position to engage the lower end of the drop arm 128, when it falls off the end of the arm 131, to prevent the arm from swinging farther than is intended. As the carriage 114 advances, the shaft 3 rocks, carrying with it the arm 131 into the position shown in dotted lines in Fig. 5, and the drop arm 128 falls off the end of the arm 131, thereby operating the rod 127, and by means of the arm 126, swinging the folders 123, 124, inwardly into position to make the under folds at the ends, as shown in Fig. 8. At this same time a loaf has been received in the pocket occupying the position of the pocket 11, Fig. 4, and a loaf has already had an end fold made in the pocket 12. As the pocket wheel 4 advances the next step, folders 134, 135, fixed to the carriage and located in proximity to the paths of the opposite ends of the loaf, fold down the remaining flaps or outer flaps, as shown in Fig. 8, leaving only the bottom of the loaf of bread exposed.

Figure 4:
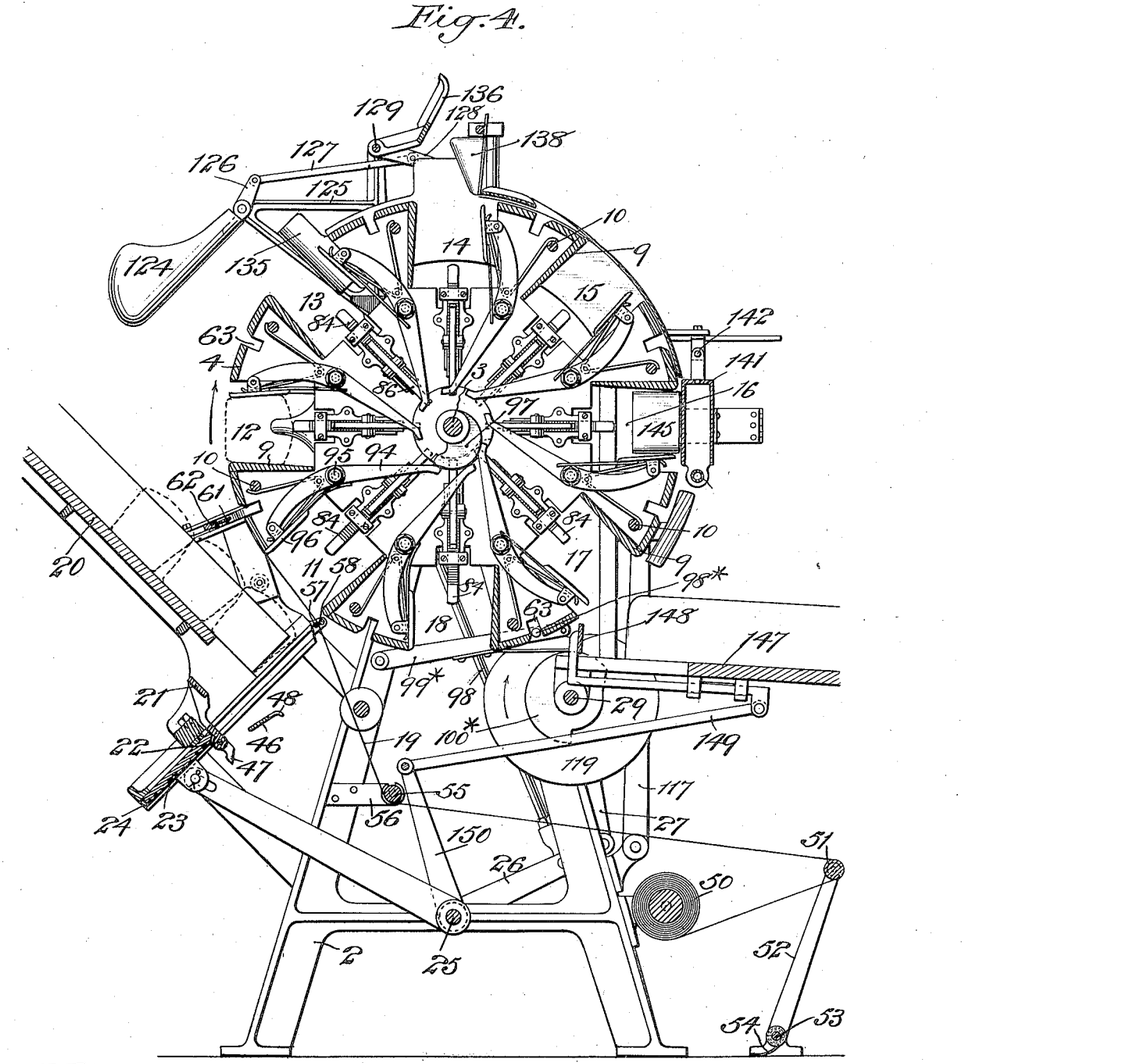
Fig. 4 is a vertical section from front to rear in the plane of the line B—B of Fig. 2.
Figure 5:
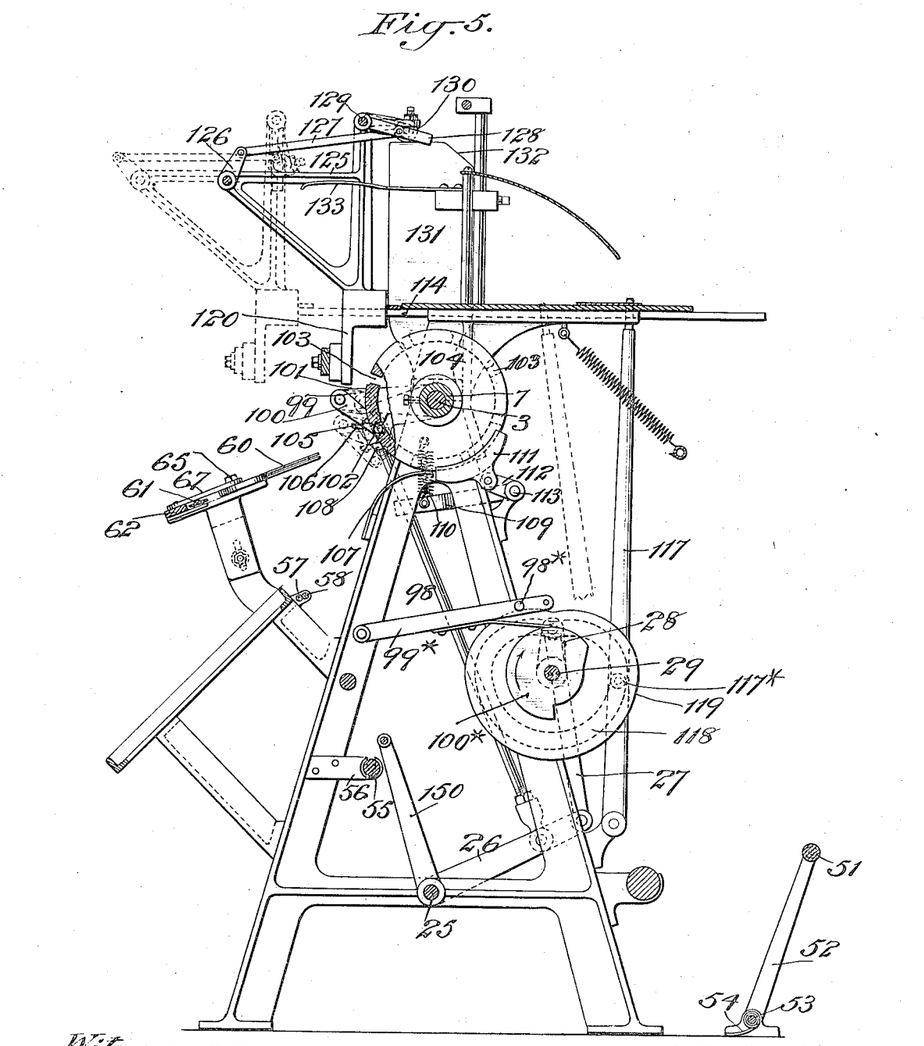

As the loaf reaches the position shown by pocket 14, Fig. 4, the advance of the carriage 114, while performing the operations already described upon the loaves occupying the positions of pockets 12 and 13, will, by the falling of the drop arm 128, rock the spindle 129 and thereby lower the folder 136 toward the bottom of the loaf into position to fold one of the projecting sides of the wrapper as shown in Fig. 9, as the carriage returns. As the pocket wheel 4 moves through a succeeding step and the several operations are carried on in the pockets occupying the positions shown by 11, 12, 13, 14, a shield 137 located in proximity to the periphery of the wheel 4 and conforming thereto, will, by means of a spring-actuated and gradually flaring nose piece 138 and the curved side lips 139, 140, fold down the opposite side flap and fold the remaining end flaps over on to the folded side flaps into the position shown in Fig. 10, in which folded position the wrapper will be held by the shield 137 and the end plates coacting with the shield, while the bottom and ends of the wrapped loaf are brought into contact with heaters as the loaf reaches the position shown by the pocket 16, Fig. 4. The main heater, which may be a gas heater or receptacle for hot steam or any other well known or approved means for applying heat, is denoted by 141, and is mounted in yielding rocking adjustment on the pivot 142. The heater is drawn gently toward the bottom of the loaf by means of a spring 143 connected conveniently with a pipe for supplying the heating medium to the heaters. For warming the folded ends of the wrapper, plates 144 and 145 are hinged to arms connected with the heater and rest in contact with the ends of the main heater, said plates becoming heated by the hot walls of the main heater and these plates 144, 145 are yieldingly drawn toward the opposite ends of the pocket by a spring 146. As the pocket wheel 4 makes another step in advance, the loaf now completely wrapped and sealed, will reach the position shown by the pocket 17, from which position it will be discharged and moved out of the path of a succeeding loaf, as follows. The spring-actuated clamping lever 94 will at this moment have its tail engaged by the cam 97, thereby lifting the clamping plate 96 from the loaf, leaving it free to slide into the discharge chute 147. Having landed in the chute 147, a pusher 148 actuated by a rod 149 connected with an arm 150 on the shaft 25 will slide forward along the chute 147, moving the loaf and those which preceded it if necessary, along the chute out of the way of a succeeding loaf.

For accurately timing the rocking of the shaft 3, with respect to the functions which the other parts coacting therewith are to perform, in addition to the elongated slot 91 in the arm 90 hereinbefore referred to, and the adjusting screw 90**, the arm 92 is given an adjustment at its opposite ends in the two sockets through a screw-threaded engagement with the sockets and jam nuts 152 and 153 for locking it in its adjusted positions.

The operations of the several parts of the machine have been set forth with such minuteness in describing them, that a detailed operation of the whole is deemed unnecessary.

The operation as a whole may be tersely stated as follows: While a loaf is being received and a loaf is being discharged, the several particularly defined operations of folding are simultaneously taking place so that at every step the pocket wheel 4 advances, when the machine is in full operation, a loaf will be received in a position occupying the position of the pocket 11 and discharged from the pocket occupying the position of the pocket 17. The feed is positive and the removal of the discharged loaf is positive, while the rotary movement of the pocket wheel coacts with stationary folders to perform certain of the folds as described and the reciprocating of the carriage performs the additional folding operations.

The machine as a whole is a comparatively simple one, automatically taking care of loaves of varying heights within reasonable limits and insuring the sealing of the folded wrapper by maintaining the bottom of the loaf where the wrapper is to be sealed, in the proper relation to the heater whatever be the height of the loaf.

It is obvious that changes might be resorted to in the form and arrangement of the parts without departing from the spirit and scope of my invention; hence I do not wish to limit myself strictly to the structure herein shown and described, but

What I claim is:

1. In a wrapping machine in which a strip of wrapping paper is fed by its engagement with a commodity and stretched between two successive commodities during the operation of wrapping, intercoacting chopping and shearing blades for chopping and shearing the paper to sever it between the commodities.

2. In a wrapping machine in which a strip of wrapping paper is stretched between two successive commodities during the operation of wrapping, a shearing blade set oblique to the plane of the paper, chopping blades and means for moving the chopping blades past the edge of the shearing blade to sever the paper.

3. In a wrapping machine in which a strip of wrapping paper is stretched between two successive commodities during the operation of wrapping, a shearing blade, means for adjusting it, double edged chopping blades and means for moving the chopping blades into position astride the shearing blade to sever the paper.

4. In a wrapping machine in which a strip of wrapping paper is stretched between two successive commodities during the operation of wrapping, a shearing blade, means for moving the shearing blade across the path of the strip and chopping blades under the control of the shearing blade to sever the opposite edges of the paper.

5. In a wrapping machine in which a rotary wheel is provided with pockets for receiving commodities to be wrapped, a movable stop at the bottom of a pocket in position to be engaged and moved by the commodity to bring the outer face of the commodity into a predetermined plane, means for locking the stop in the position in which it may have been moved by the commodity and means for forcing the commodity into the pocket.

6. In a wrapping machine in which a rotary wheel is provided with pockets for receiving commodities to be wrapped and means for forcing a commodity into a pocket, independent stops at the bottom of a pocket and means for automatically locking the stops when the outer face of the commodity reaches a predetermined plane.

7. In a wrapping machine in which a rotary wheel is provided with pockets for receiving commodities to be wrapped and means for forcing the commodity into a pocket, a movable stop at the bottom of a pocket in the path of the commodity, a pawl for locking the stop when the commodity reaches a predetermined position and a cam for operating the pawl.

8. In a wrapping machine, a commodity receiving pocket, means for feeding a commodity into the pocket and means for automatically seating the commodity comprising a gravity stop in position to be pushed back by the commodity, a pawl for arresting the stop and a cam for operating the pawl.

9. In a wrapping machine, a rotary pocket wheel for receiving and carrying commodities to be wrapped, in combination with means for feeding the commodity to the wheel, means for wrapping the commodity while carried by the wheel, a heater in proximity to the wheel for sealing the wrapped commodity and means for maintaining the side of the commodity which is to come adjacent to the heater in a predetermined position whatever be the height of the commodity within the limits of the machine.

10. In a wrapping machine, the combination with the wheel provided with commodity receiving pockets, of a reciprocating tilting pusher for forcing a commodity into a pocket and a machine stopping mechanism under the control of said pusher to stop the machine when there is no commodity in the path of the pusher.

11. In a wrapping machine, the combination with the wheel provided with commodity receiving pockets, of a reciprocating slide, a tilting pusher carried by the slide, means for directing a commodity to be wrapped in front of the pusher and a machine stopping mechanism under the control of the tilting pusher to stop the machine when there is no commodity in the path of the pusher.

12. In a wrapping machine, the combination with the wrapping mechanism and a chute for directing superposed commodities into position to be fed to the wrapping mechanism, of a reciprocating pusher for feeding the lowermost of the commodities to the wrapping mechanism and a machine stopping mechanism under the control of the pusher to stop the machine when there is no commodity in the path of the pusher on its return stroke.

13. In a wrapping machine, the combination with the wrapping mechanism, of a reciprocating tilting pusher for advancing a commodity to the wrapping mechanism, a belt shifter for stopping the machine, a spring for operating the belt shifter, a swing dog for holding the belt shifter in operative position and an arm in the path of the tilting pusher for throwing the dog out of engagement with the belt shifter when no commodity lies in the path of the pusher.

14. In a wrapping machine, a rotary wheel having commodity receiving pockets in its periphery, means for forcing commodities to be wrapped into the pockets, a rock shaft on which the wheel is mounted, spring actuated clamps pivoted on the wheel with ends extending inwardly toward the center of the wheel, a cam on the rock shaft in position to engage the said inwardly extending ends of the pivoted clamps as the pockets reach a position where the commodity is to be discharged and means for rocking the shaft and hence the cam to release a clamp when a commodity has been forced into a pocket.

15. In a wrapping machine, a rotary wheel having commodity receiving pockets in its periphery, means for forcing commodities to be wrapped into the pockets, a reciprocating carriage, means for rotating the wheel and reciprocating the carriage timed with respect to one another, and wrapper folders carried by the carriage and arranged to simultaneously operate upon packages in successive pockets.

16. In a wrapping machine, a rotary wheel having commodity receiving pockets in its periphery, means for forcing commodities to be wrapped into the pockets, a reciprocating carriage, means for rotating the wheel and reciprocating the carriage timed with respect to one another, and folders fixed to the carriage in position to engage a wrapper in one pocket, end folders pivotally attached to the carriage in position to engage a wrapper in another pocket and means carried by the carriage for operating the said pivoted end folders.

17. In a wrapping machine, a rotary wheel having commodity receiving pockets in its periphery, means for forcing commodities to be wrapped into the pockets, a reciprocating carriage, means for rotating the wheel and for reciprocating the carriage timed with respect to one another, end folders pivoted to the carriage in position to operate on the wrapper in one pocket when the carriage moves in one direction, and side folders pivoted to the carriage in position to operate on the wrapper when the carriage moves in the opposite direction and means carried by the carriage for operating the said pivoted folders.

18. In a wrapping machine, a rotary commodity receiving wheel provided with pockets, means for feeding commodities into the pockets, means for rotating the wheel step by step, a reciprocating carriage, end folders fixed to the carriage in position to operate on the wrapper in one pocket, end folders pivoted to the carriage in position to operate on the wrapper in another pocket, a side folder pivoted to the carriage in position to operate on the wrapper in a third pocket, side and end folders fixed relatively to the wheel and carriage for operating on the wrapper in said third pocket and means for reciprocating the carriage.

19. In a wrapping machine, a rotary wheel provided with pockets for receiving commodities to be wrapped, wrapping mechanism for folding a wrapper about each commodity and means for rotating the wheel, said wrapping mechanism including pivoted end and side folders located, the one in position to operate on a wrapper in one pocket and the other in position to operate on a wrapper in another pocket and a drop lever common to the said end and side folders for swinging them into operative position.

20. In a wrapping machine, a rotary wheel provided with commodity receiving pockets and means for imparting to said wheel a step by step motion, said mechanism comprising a wheel provided at its periphery with recesses, a rocking arm provided with a pin to enter the recesses, one at a time, and a spring in position to crowd the pin into a recess, the said recesses having a beveled side to throw the pin out when pushed in one direction.

21. In a wrapping machine, a rotary wheel provided with commodity receiving pockets and means for imparting to said wheel a step by step motion, said wheel operating means including a wheel provided with recesses in its periphery, a rocking arm having a projection adapted to enter the recesses one at a time, a spring for crowding the projection into a recess, a rod for operating the rocking arm and a brake under the control of said rod for preventing unintentional movement of the wheel.

In testimony, that I claim the foregoing as my invention, I have signed my name in presence of two witnesses, this 29th day of January 1912.

RAYMOND EVERETT FUDGE.

Witnesses:
Wm. E. Rowland,
G. C. Moore.